United States Patent
Ogawa et al.

(10) Patent No.: US 6,450,818 B1
(45) Date of Patent: Sep. 17, 2002

(54) ACTIVITY-SUPPORT INSTRUCTIONAL SYSTEMS

(75) Inventors: Yoshimi Ogawa, Hyogo; Akio Kojima, Kakogawa, both of (JP)

(73) Assignee: Daicel Chemical Industries, Ltd., Sakai (JP)

( * ) Notice: Subject to any disclaimer, the term of this patent is extended or adjusted under 35 U.S.C. 154(b) by 0 days.

(21) Appl. No.: 09/472,234

(22) Filed: Dec. 27, 1999

(30) Foreign Application Priority Data

Dec. 28, 1998 (JP) .......................................... 10-372830

(51) Int. Cl.⁷ ................................................ G09B 9/00
(52) U.S. Cl. ............................. 434/118; 43/218; 43/72; 703/18
(58) Field of Search ......................... 434/72, 224, 218, 434/219, 118; 703/18

(56) References Cited

U.S. PATENT DOCUMENTS

| | | | | |
|---|---|---|---|---|
| 3,889,106 A | * | 6/1975 | Alliston et al. ................ | 703/18 |
| 3,903,403 A | * | 9/1975 | Ferguson et al. ............. | 703/18 |
| 3,919,720 A | * | 11/1975 | Alliston ........................ | 700/23 |
| 4,316,720 A | * | 2/1982 | Ackerman ................... | 434/224 |
| 5,306,154 A | * | 4/1994 | Ujita et al. .................. | 434/218 |
| 5,604,892 A | * | 2/1997 | Nuttall et al. ................. | 703/18 |
| 6,033,226 A | * | 3/2000 | Bullen ........................ | 434/219 |

FOREIGN PATENT DOCUMENTS

| | | | |
|---|---|---|---|
| JP | 2-77079 | * 3/1990 | ................... 434/72 |
| JP | 8-166815 | 6/1996 | |
| JP | 8-320723 | 12/1996 | |
| JP | 10-31408 | 2/1998 | |

* cited by examiner

*Primary Examiner*—Joe H. Cheng
*Assistant Examiner*—Kathleen M. Christman
(74) *Attorney, Agent, or Firm*—Oblon, Spivak, McClelland, Maier & Neustadt, P.C.

(57) ABSTRACT

An activity-support instructional system includes: (1) operation monitor and control means (A) for entering process condition signals from plural pieces of equipment constituting a plant on an identifying means basis uniquely provided on each piece of the equipment to monitor and control each piece of equipment; (2) a computer-assisted instructional system unit (B) having instructional information entered and configured therein, the instructional information being related to the above equipment and other equipment to be used in general plants; and (3) mediating means (C1) which links individual pieces of equipment monitored and controlled by the operation monitor and control means (A) with the instructional information of the computer-assisted instructional system unit (B), the information being related to the individual pieces of equipment on the basis of the identifying means, and which is capable of selecting, unarchiving and displaying necessary instructional information on the individual piece of equipment on the basis of the identifying means. By the use of the instructional system, operators can immediately gain and learn necessary information in the line of duty during operation or in case of necessity.

7 Claims, 4 Drawing Sheets

ACTIVITY-SUPPORT INSTRUCTIONAL SYSTEMS

BACKGROUND OF THE INVENTION

1. Field of the Invention

The present invention relates to activity-support instructional systems to learn techniques, skills and knowledge necessary for operation control and equipment management in a variety of manufacturing plants for the manufacture of products. Such manufacturing plants include, but are not limited to, chemicals manufacturing plants, petrochemicals manufacturing plants, petroleum refining plants, steel products manufacturing plants, food products manufacturing plants, and pulp and paper products manufacturing plants.

More particularly, it relates to activity-support instructional systems composed of a combination of an operation monitor and control means to monitor the operations and equipment of these manufacturing plants, an operation control system, a process database, a technical database, a simulator to perform a simulated operation training by the use of a simulated process, and a computer-assisted instructional system having techniques and knowledge necessary for the operation control and equipment management entered and configured therein.

2. Description of the Related Art

Instructional systems utilizing computer technologies and multimedia technologies (audiovisuals including animations and illustrations) (computer-assisted instructional systems: hereinafter may briefly be referred to as "CAI unit(s)") have been developed in factories, as well. These systems are to learn basic knowledge on equipment, as well as general techniques, skills, know-how (expertise) on methods for plant maintenance, electric instrumentation, chemical engineering, mechanical engineering, and principles related to these matters, all of which are necessary for operation control and equipment management. The systems can be used on personal computers, and learners can learn curriculums in the form of a dialog with the use of the systems, and can select and learn an individual curriculum suitable for their individual progress according to levels of their own knowledge, experiences and skills. They can repeat learning one curriculum if they cannot sufficiently understand, or can skip over a curriculum if they grasp the details completely.

Separately, in the operation control of manufacturing plants, distributed control systems (DCSs) for operation control and equipment monitor, and host computer systems of the DCSs are employed, which utilize cathode-ray tubes (CRTs), liquid-crystal displays (LCD) or other displays. Operation administrators (operators) decide measures to be taken in actual operations on the basis of information obtained from these systems. In this connection, the host computer systems are constructed to work process condition signals and/or variables transmitted from the DCSs according to objectives and thereby obtain control points necessary for optimum operations (optimum for, e.g., qualities, efficiencies, facilities and safety of the processes).

However, if operators intend to learn with the use of conventional CAI units supplied as stand-alone units in order to clear up questions and ease insecurities, or in order to learn basic principles on equipment, learning effects depend on the levels of skills and knowledge of the learners. This is because the information obtained by such conventional CAI units is not linked with the plants, equipment, and operation information which the learners actually operate.

In the learning with the use of such conventional CAI units, the information in the CAI units is not linked with the learners' own techniques, skills, expertise, experiences on troubles and failures, operation histories in disorders, which have been obtained in the past operation control and equipment management. Accordingly, some learners feel the instructional information in the CAI units not specific but vague, which reduces the motivation for learning. To achieve satisfactory learning effects, instructors or the like having sufficient techniques, skills and experiences are indispensable to bridge gaps between, and link the equipment in practical use and the instructional information of the CAI units.

In addition, the above learning method can provide neither sufficient sense of unity (approach) between the task and instruction nor learning immediately after a question or insecurity arises. It therefore requires an extra time period for learning, which prevents effective learning.

Separately, dynamic simulators have been developed, which have simulated plants (virtual plants) on computer systems to enable simulated operation training on equipment actually used in plants. In such simulated operation training using the dynamic simulators, however, general knowledge on a target piece of equipment of the simulation and findings and operation histories on individual pieces of the equipment cannot immediately be obtained before or during the training, which deteriorates the learning effect, as well as in the above cases.

SUMMARY OF THE INVENTION

Accordingly, it is an object of the present invention to provide an activity-support instructional system, which ensures an operator to gain necessary information and to learn in the excursion of his/hers duties during operation or should the necessity arise.

Another object of the invention is to provide an activity-support instructional system, which can immediately provide general instructional information or process information of the past on equipment constituting a plant when necessary, and enables efficient learning and training.

After intensive investigations to achieve the above objects, the present inventors found that learning effects can remarkably be improved in the use of computer-assisted instructional systems holding general instructional information on equipment constituting a plant, which information is entered and configured therein, or of database units holding the past process information data on the equipment of the plant. A solution to this is to provide a mediating means for linking an individual piece of equipment constituting the plant with information and data of the instructional systems or database units on the basis of an identifying means uniquely provided on each of the equipment, and for selecting, unarchiving and displaying necessary information and data. The invention has been accomplished based on the above finding.

To be more specific, the invention provides, in an aspect, an activity-support instructional system (hereinafter may simply be referred to as "the instructional system 1") including: (1) operation monitor and control means (A) for entering process condition signals from plural pieces of equipment constituting a plant on an identifying means basis to monitor and control each piece of the equipment, the identifying means being uniquely provided on each piece of the equipment; (2) a computer-assisted instructional system unit (B) having instructional information entered and configured therein, the instructional information being related to the equipment and other equipment to be used in general plants; and (3) a mediating means (C1) which links an individual piece of equipment monitored and controlled by the operation monitor and control means (A) with instructional information of the computer-assisted instructional system unit (B) related to the individual piece of equipment on the basis of the identifying means, and which is capable of selecting, unarchiving and displaying necessary instructional information on the individual piece of equipment on the basis of the identifying means.

In another aspect, the invention provides an activity-support instructional system (hereinafter may simply be referred to as "the instructional system 2") including: (1) operation monitor and control means (A) for entering process condition signals from plural pieces of equipment constituting a plant on an identifying means basis to monitor and control each piece of the equipment, the identifying means being uniquely provided on each piece of the equipment; (2) a computer-assisted instructional system unit (B) having instructional information entered and configured therein, the instructional information being related to equipment to be used in general plants including the equipment; (3) at least one database unit (D) selected from a process database unit (D1) and a technical database unit (D2), the process database unit (D1) having operation data composed of process condition signals stored in time sequence on each of the identifying means basis, the process condition signals being from each piece of equipment constituting the plant, and the technical database unit (D2) having technical data composed of information or capability/performance of the equipment or both, the information or capability/performance or both being collected, processed and reduced on each the identifying means basis, and the information being process information related to process conditions in disorder, in fluctuations or in troubles of the past of the each piece of the equipment; and (4) at least mediating means (C1) or (C3) of the following three mediating means: (4-1) a mediating means (C1) which links an individual piece of equipment monitored and controlled by the operation monitor and control means (A) with instructional information of the computer-assisted instructional system unit (B) related to the individual piece of equipment on the basis of the identifying means, and which is capable of selecting, unarchiving and displaying necessary instructional information on the individual piece of equipment on the basis of the identifying means; (4-2) a mediating means (C2) which links an individual piece of equipment monitored and controlled by the operation monitor and control means (A) with data of the database unit (D) related to each piece of the equipment on the basis of the identifying means, and which is capable of selecting, unarchiving and displaying the operation data or technical data necessary for the individual piece of equipment on the basis of the identifying means; and (4-3) a mediating means (C3) which links data of the database unit (D) related to each piece of equipment with the instructional information of the computer-assisted instructional system unit (B) on the basis of the identifying means, and which is capable of selecting, unarchiving and displaying necessary instructional information on the each piece of equipment on the basis of the identifying means.

The invention provides, in a further aspect, an activity-support instructional system (hereinafter may briefly referred to as "the instructional system 3") including: (1) operation monitor and control means (A) for entering process condition signals from plural pieces of equipment constituting a plant on an identifying means basis to monitor and control each piece of the equipment, the identifying means being uniquely provided on each piece of the equipment; (2) a computer-assisted instructional system unit (B) having instructional information entered and configured therein, the instructional information being related to the equipment and other equipment to be used in general plants; (3) a dynamic simulator (E) for enabling a simulated operation training on equipment constituting the plant; and (4) at least mediating means (C1) or (C4) of the following three mediating means: (4-1) a mediating means (C1) which links an individual piece of equipment monitored and controlled by the operation monitor and control means (A) with instructional information of the computer-assisted instructional system unit (B) related to the individual piece of equipment on the basis of the identifying means, and which is capable of selecting, unarchiving and displaying necessary instructional information on the individual piece of equipment on the basis of the identifying means; (4-2) a mediating means (C4) which links an individual piece of equipment monitored and controlled by the operation monitor and control means (A) with each piece of equipment to be a target of a simulated operation in the dynamic simulator (E) on the basis of the identifying means, and which is capable of selecting, unarchiving and displaying a simulated operation on the each piece of equipment on the basis of the identifying means; and (4-3) a mediating means (C5) which links each piece of equipment to be a target of a simulated operation in the dynamic simulator (E) with instructional information of the computer-assisted instructional system unit (B) on the basis of the identifying means, and which is capable of selecting, unarchiving and displaying necessary instructional information on the each piece of equipment.

The invention provides, in yet another aspect, an activity-support instructional system (hereinafter may simply be referred to as "the instructional system 4") including: (1) operation monitor and control means (A) for entering process condition signals from plural pieces of equipment constituting a plant on an identifying means basis to monitor and control each piece of the equipment, the identifying means being uniquely provided on each piece of the equipment; (2) a computer-assisted instructional system unit (B) having instructional information entered and configured therein, the instructional information being related to the equipment and other equipment to be used in general plants; (3) at least one database unit (D) selected from a process database unit (D1) and a technical database unit (D2), the process database unit (D1) having operation data composed of process condition signals stored in time sequence on each of the identifying means basis, the process condition signals being from each piece of equipment constituting the plant, and the technical database unit (D2) having technical data composed of information or capability/performance of the equipment or both, the information or capability/performance or both being collected, processed and reduced on each the identifying means basis, and the information being process information related to process conditions in disorder, in fluctuations or in troubles of the past of the each piece of the equipment; (4) a dynamic simulator (E) for enabling a simulated operation training on equipment constituting the plant; and (5) at least mediating means (C1), (C3) or (C6) of the following six mediating means: (5-1) a mediating means (C1) which links an individual piece of equipment monitored and controlled by the operation monitor and control means (A) with instructional information of the computer-assisted instructional system unit (B) related to the individual piece of equipment on the basis of the identifying means, and which is capable of selecting, unarchiving and displaying necessary instructional information on the individual piece of equipment on the basis of the identifying means; (5-2) a mediating means (C2) which links an individual piece of equipment monitored and controlled by the operation monitor and control means (A) with data of the database unit (D) related to each piece of the equipment on the basis of the identifying means, and which is capable of selecting, unarchiving and displaying the operation data or technical data necessary for the individual piece of equipment on the basis of the identifying means; (5-3) a mediating means (C3) which links data of the database unit (D) related to each piece of equipment with the instructional information of the computer-assisted instructional system unit (B) on the basis of the identifying means, and which is capable of selecting, unarchiving and displaying necessary instructional information on the each piece of equipment on the basis of the identifying means; (5-4) a mediating means (C4) which links an individual piece of equipment monitored and controlled by the operation monitor and control means (A) with each piece of equipment to be a target of a simulated operation in the dynamic simulator (E) on the basis of the identifying means, and which is capable of selecting, unarchiving and displaying a simulated operation on the each piece of equipment on the basis of the identifying means; (5-5) a mediating means (C5) which links each piece of equipment to be a target of a simulated operation in the dynamic simulator (E) with instructional information of the computer-assisted instructional system unit (B) on the basis of the identifying means, and which is capable of selecting, unarchiving and displaying necessary instructional information on the each piece of equipment; and (5-6) a mediating means (C6) which links each piece of equipment to be a target of a simulated operation in the dynamic simulator (E) with data of the database unit (D) related to the each piece of equipment on the basis of the identifying means, and which is capable of selecting, unarchiving and displaying the operation data or technical data necessary on the each piece of equipment on the basis of the identifying means.

In a yet further aspect, the invention provides an activity-support instructional system (hereinafter may simply be referred to as "the instructional system 5") including: (1) operation monitor and control means (A) for entering process condition signals from plural pieces of equipment constituting a plant on an identifying means basis to monitor and control each piece of the equipment, the identifying means being uniquely provided on each piece of the equipment; (2) at least one database unit (D) selected from a process database unit (D1) and a technical database unit (D2), the process database unit (D1) having operation data composed of process condition signals stored in time sequence on each of the identifying means basis, the process condition signals being from each piece of equipment constituting the plant, and the technical database unit (D2) having technical data composed of information or capability/performance of the equipment or both, the information or capability/performance or both being collected, processed and reduced on each the identifying means basis, and the information being process information related to process conditions in disorder, in fluctuations or in troubles of the past of the each piece of the equipment; (3) a dynamic simulator (E) for enabling a simulated operation training on equipment constituting the plant; and (4) at least mediating means (C6) of the following three mediating means: (4-1) a mediating means (C2) which links an individual piece of equipment monitored and controlled by the operation monitor and control means (A) with data of the database unit (D) related to each piece of the equipment on the basis of the identifying means, and which is capable of selecting, unarchiving and displaying the operation data or technical data necessary for the individual piece of equipment on the basis of the identifying means; (4-2) a mediating means (C4) which links an individual piece of equipment monitored and controlled by the operation monitor and control means (A) with each piece of equipment to be a target of a simulated operation in the dynamic simulator (E) on the basis of the identifying means, and which is capable of selecting, unarchiving and displaying a simulated operation on the each piece of equipment on the basis of the identifying means; and (4-3) a mediating means (C6) which links each piece of equipment to be a target of a simulated operation in the dynamic simulator (E) with data of the database unit (D) related to the each piece of equipment on the basis of the identifying means, and which is capable of selecting, unarchiving and displaying the operation data or technical data necessary on the each piece of equipment on the basis of the identifying means.

The invention provides, in another aspect, an activity-support instructional system (hereinafter may simply be referred to as "the instructional system 6") including: (1) at least one database unit (D) selected from a process database unit (D1) and a technical database unit (D2), the process database unit (D1) having operation data composed of process condition signals stored in time sequence on each of the identifying means basis, the process condition signals being from each piece of equipment constituting the plant, and the technical database unit (D2) having technical data composed of information or capability/performance of the equipment or both, the information or capability/performance or both being collected, processed and reduced on each the identifying means basis, and the information being process information related to process conditions in disorder, in fluctuations or in troubles of the past of the each piece of the equipment; (2) a computer-assisted instructional system unit (B) having instructional information entered and configured therein, the instructional information being related to the equipment and other equipment to be used in general plants; and (3) a mediating means (C3) which links data of the database unit (D) related to each piece of equipment with the instructional information of the computer-assisted instructional system unit (B) on the basis of the identifying means, and which is capable of selecting, unarchiving and displaying necessary instructional information on the each piece of equipment on the basis of the identifying means.

In a further aspect, the invention provides an activity-support instructional system (hereinafter may simply be referred to as "the instructional system 7) including: (1) at least one database unit (D) selected from a process database unit (D1) and a technical database unit (D2), the process database unit (D1) having operation data composed of process condition signals stored in time sequence on each of the identifying means basis, the process condition signals being from each piece of equipment constituting the plant, and the technical database unit (D2) having technical data composed of information or capability/performance of the equipment or both, the information or capability/performance or both being collected, processed and reduced on each the identifying means basis, and the information being process information related to process conditions in disorder, in fluctuations or in troubles of the past of the each piece of the equipment; (2) a computer-assisted instructional system unit (B) having instructional information entered and configured therein, the instructional information being related to the equipment and other equipment to be used in general plants; (3) a dynamic simulator (E) for enabling a simulated operation training on equipment constituting the plant; and (4) at least mediating means (C3) or (C6) of the following three mediating means: (4-1) a mediating means (C3) which links data of the database unit (D) related to each piece of equipment with the instructional information of the computer-assisted instructional system unit (B) on the basis of the identifying means, and which is capable of selecting, unarchiving and displaying necessary instructional information on the each piece of equipment on the basis of the identifying means; (4-2) a mediating means (C5) which links each piece of equipment to be a target of a simulated operation in the dynamic simulator (E) with instructional information of the computer-assisted instructional system unit (B) on the basis of the identifying means, and which is capable of selecting, unarchiving and displaying necessary instructional information on the each piece of equipment; and (4-3) a mediating means (C6) which links each piece of equipment to be a target of a simulated operation in the dynamic simulator (E) with data of the database unit (D) related to the each piece of equipment on the basis of the identifying means, and which is capable of selecting, unarchiving and displaying the operation data or technical data necessary on the each piece of equipment on the basis of the identifying means.

In addition and advantageously, the invention provides an activity-support instructional system (hereinafter may simply be referred to as "the instructional system 8") including: (1) at least one database unit (D) selected from a process database unit (D1) and a technical database unit (D2), the process database unit (D1) having operation data composed of process condition signals stored in time sequence on each of the identifying means basis, the process condition signals being from each piece of equipment constituting the plant, and the technical database unit (D2) having technical data composed of information or capability/performance of the equipment or both, the information or capability/ performance or both being collected, processed and reduced on each the identifying means basis, and the information being process information related to process conditions in disorder, in fluctuations or in troubles of the past of the each piece of the equipment; (2) a dynamic simulator (E) for enabling a simulated operation training on equipment constituting the plant; and (3) a mediating means (C6) which links each piece of equipment to be a target of a simulated operation in the dynamic simulator (E) with data of the database unit (D) related to the each piece of equipment on the basis of the identifying means, and which is capable of selecting, unarchiving and displaying the operation data or technical data necessary on the each piece of equipment on the basis of the identifying means.

DESCRIPTION OF THE PREFERRED EMBODIMENT

The embodiments of the invention will now be illustrated in detail with reference to the drawings where necessary.

Figure 1:
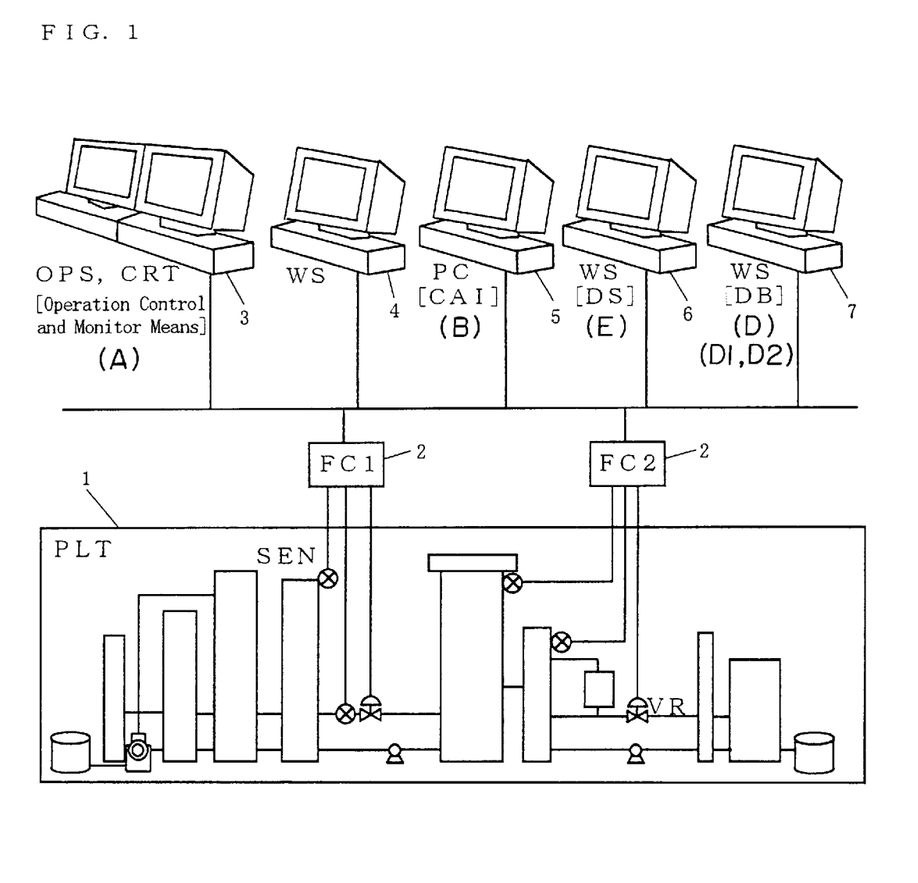
FIG. 1 is a schematic diagram illustrating an example of an overall operation control system of a plant to which the inventive activity-support instructional system is applied.
Figure 2:
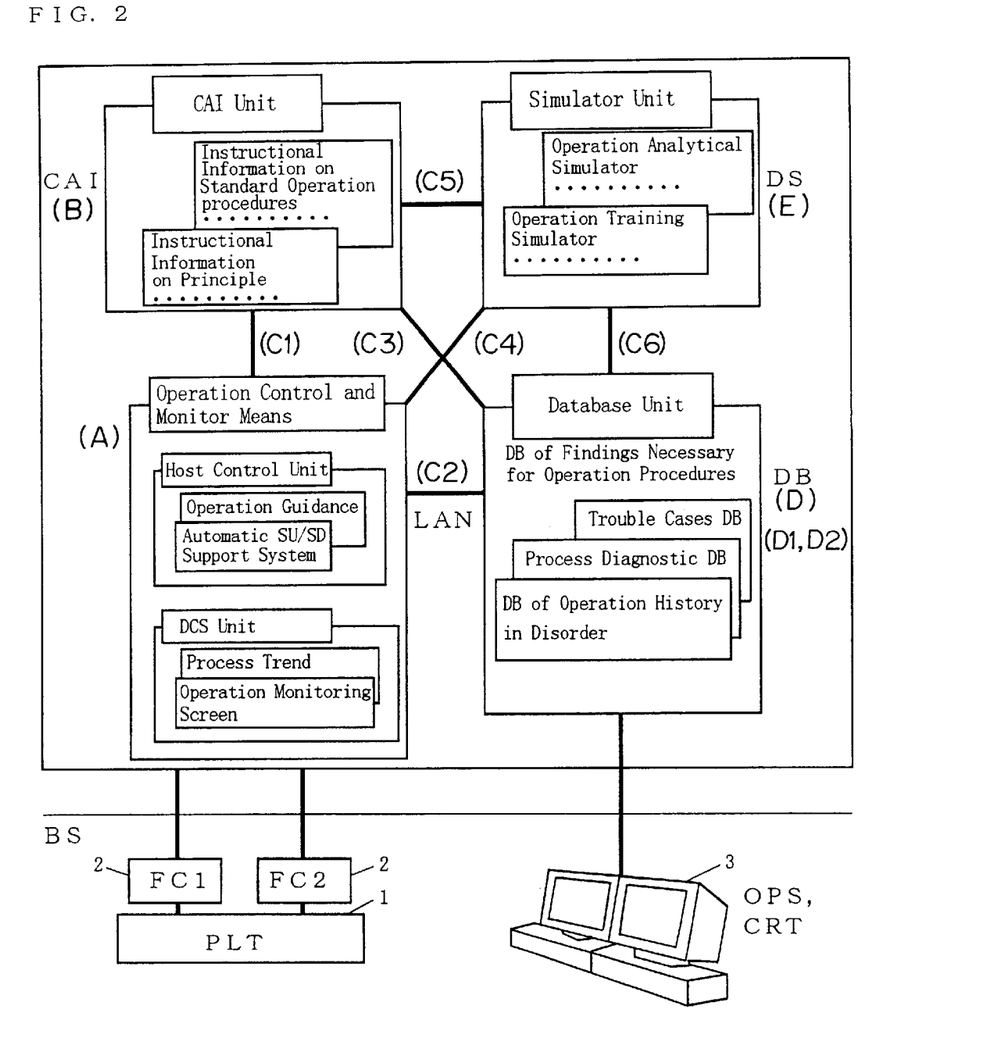
FIG. 2 is a functional block diagram showing an embodiment of the inventive activity-support instructional system.

FIG. 1 is a schematic diagram illustrating an example of an overall operation control system of a plant to which the inventive activity-support instructional system is applied, and FIG. 2 is a functional block diagram showing an embodiment of the inventive activity-support instructional system.

In FIGS. 1 and 2, a plant 1 generally represents an overall manufacturing plant (PLT). Such plants include, but are not limited to, chemicals manufacturing plants, petrochemicals manufacturing plants, petroleum refining plants, steel products manufacturing plants, food products manufacturing plants, and pulp and paper products manufacturing plants. The plant 1 is composed of, for instance, a chemical reactor, a still, a heat exchanger, a compressor, a variety of pumps, piping, and other equipment. Each piece of the equipment has a sensor (SEN), valve (VR) or another actuator in a predetermined location. In this connection, the term "equipment" used herein covers a wide variety of concepts including not only a single piece of device or equipment but also units composed of plural pieces of equipment, and the above sensor, valve and other actuator are also included therein.

An individual identifying means is uniquely provided on each piece of equipment of the plant 1 to identify the piece of equipment. The identifying means can be numbers, characters, symbols, and any other identifying means (including means for identifying inclusively plural pieces of equipment) as far as capable of identifying the pieces of equipment of the plant, and can be any embodiment according to objectives. The identifying means include, but are not limited to, (i) tag numbers (e.g., tag numbers for indicators, controllers and automatic valves for flow rates, temperatures, liquid levels and pressures), (ii) instrumental numbers (e.g., tank numbers, pump numbers, distilling column numbers; including device numbers, facility numbers, and body numbers), (iii) instrumental designations (e.g., instrumental designations such as a pump, tank, blower and heat exchanger), (iv) unit designations (e.g., a designation of a unit having a given function such as a distillation unit; names of unit operation units), (v) functional designations (e.g., fluidization, heat transfer, vaporization, crystallization, absorption, distillation, moisture conditioning, cooling, drying (desiccation), extraction, adsorption, separation, filtration, precipitation, dust collection, grinding or pulverization, stirring (agitation), mixing, heating, reaction, and other names of unit operation functions), and (vi) identification numbers (numbers to identify the above (i) to (v) according to objectives).

A control station 2 is a control station (FC) for controlling the plant 1. In this embodiment, two units (FC1 and FC2) of the control station 2 are individually located in each unit to be controlled. Into the control station 2 are input process condition signals from a variety of actuators (SEN), and control outputs (operation signals) are output therefrom to valves (VR), and other actuators and individual pieces of equipment as required. The numeral 3 inclusively represents an operator station (OPS), which an operator actually operates and a cathode-ray tube (CRT) as a display for operation monitoring. In general, the term "DCS" (distributed control system) as used herein includes the overall of the FC, OPS and CRT. The term "process condition signal(s)" means and includes specific signals converted from process variables by sensors. Such process variables include, but are not limited to, temperatures, pressures, flow rates, liquid levels, displacements and angles, numbers of revolution, compositions, concentrations, masses (weights), densities, amounts of electric current, and measurements of voltage.

In this embodiment, the operation monitor and control means according to the invention is configured as a DCS. In other words, input/output signals of each piece of equipment constituting the plant 1 are managed and controlled by the DCS on the basis of the identifying means (e.g., tag numbers). To be more specific, each of process condition signals showing operation conditions is transmitted from each piece of equipment through the control station (FC) 2 via a line on identifying means (e.g., a tag number) basis provided on each piece of equipment into OPS, and is displayed on CRT as necessary to monitor and control operation circumstances and to manage production circumstances. Operation/instruction signals (control signals) necessary for each piece of equipment of the plant are transmitted from a control panel provided on OPS via a line to each of the control station (FC) to control each piece of equipment.

Work stations (WSs) 4, 6 and 7 are industrial computers, whereas a personal computer (PC) 5 is provided separately. In the present embodiment, the inventive computer-assisted instructional system unit (CAI unit) (CAI) is constructed in the personal computer (PC), and the database unit (DB) including a process database unit and/or a technical database unit, and dynamic simulator (DS) are constructed in the work stations (WSs).

Into the CAI unit (CAI) are entered and configured instructional information on, for example, basic configurations, principles, functions and actions, performances, features and maintenance methods of equipment to be used in general plants including the equipment used in the present plant 1, and the CAI unit is configured so as to enhance learning effects by the use of audiovisuals and other multimedia technologies.

The instructional information on equipment to be used in general plants which is configured in the CAI unit beforehand includes, but is not limited to, distillation, heat transfer, pumps, compressors, chemical reactions, valves, piping, electric, sequential control, programmable controllers, clamping adjustment of bolts and nuts, assembly adjustment of bearings, centering of coils of rotating machines, balance adjustment of rotating machines, maintenance of machine elements, maintenance of rotating machines, maintenance of hydraulic/pneumatic devices, maintenance of electric, maintenance of instrumentation, facility diagnostic technologies, lubrication technologies, corrosion and anti-corrosive technologies, and sealing technologies.

The process database unit of the database unit (DB) holds operation data composed of process condition signals stored in time sequence on an identifying means basis (e.g., tag numbers), which process condition signals are from each piece of equipment constituting the plant 1, and it can output, for example, operation data (e.g. process trends) on several-minutes-basis, on several-hours-basis, on a month basis or on a seasonal basis.

The technical database unit of the database unit (DB) holds technical data composed of information or capability/performance of the equipment or both, which information or capability/performance or both are collected, processed and reduced according to the identifying means, and the information is related to process conditions in disorders, in fluctuations or in troubles of process information of the past of each piece of the equipment and/or the plant 1 operated and controlled by the operation monitor and control means. Such technical data include, but are not limited to, operation histories in disorder of each piece of the equipment, the effects and results thereof, case examples and causes of troubles, operation guidance (cause-and-effect diagrams of occurrence of disorder and assumed causes thereof), risk prediction data in processes, operation expertise of experienced operators, capability/performance characteristic diagrams in design of the equipment, and other useful information for operation control.

To be more specific, a database can be prepared in the following manner: A flow meter which is provided in the plant in question and enters a process flow rate (process condition signal) into the operation monitor and control unit is taken as an actual example of a piece of the equipment on the process. Assumed causes in the case that the process flow rate becomes more than, or less than a normal value during operation are listed up as much as possible by one who understands the plant in enough detail, and for each of the assumed causes, criteria (methods for identifying the assumed cause), effects on the process, measures to be taken (methods for adaptation) are described in a matrix or array to give a database. Separately, track records of the past troubles (disorders) of a pump actually present on the process are classified by tag number (or each instrumental number or another identifying means) of the pump, and the species of the pump, date when a trouble occurs (year, month, day), circumstances of the occurrence, causes, effects, measures and other trouble (disorder) information is collected and reduced by tag number to give a database. The information can also be classified, collected, and reduced not by tag number but by group of pumps of the same type. Likewise, databases described in a matrix or array can be constructed on, in addition to the above flowmeter and pump, distillation columns, extraction columns, reactors, gasifying furnaces, heating furnaces, heat exchangers, compressors, control valves, remotely operated valves, motors, conveyers, blowers, dryers, stirrers (agitators), thermometers, pressure gauges, viscometers, airflow meters, hygrometers, densitometers or concentration meters, moisture meters, density meters, ampere meters, voltmeters, piping, and all the other pieces of equipment in the process.

The dynamic simulator (DS) is a simulator having dynamic simulating facility and having simulated processes constructed on a computer system to enable a simulated operation training on the equipment used in the plant 1. In FIG. 2, the symbol "BS" is a communication bus.

The work station (WS) generally takes charge of engineering, process databases, databases, and other functions when it is used in combination with the DCS, but it can be used in the same manner as the DCS for control when a duplexed or multiplexed system is not required for control. Consequently, in the invention, the operation monitor and control means can also be constructed in the workstation (WS) Separately, the CAI unit (CAI) can be constructed in the workstation (WS), and the process database unit, technical database unit, and dynamic simulator (DS) can respectively be constructed in the personal computer (PC). Part of the process database unit can also be constructed in DCS.

The individual pieces of equipment or means [operation monitor and control means, CAI unit, dynamic simulator, database unit (process database unit and/or technical database unit)] shown in the functional block diagram of FIG. 2 are connected with one another via communication cables as a mediating means to constitute a local area network (LAN). The associations (linkages) of the instructional information, data and other matters stored in the individual pieces of equipment with each piece of equipment constituting the plant have been set and stored in the system beforehand on the basis of the identifying means. The associations (linkages) can take a variety of embodiments according to objectives, and for instance, plural associations (linkages) can be made with respect to one piece (or one unit) of equipment. The system is configured in such a manner that a variety of information can be selected, unarchived and displayed on a CRT display of DCS constituting the operation monitor and control means where necessary on the basis of the identifying means, and can be measured and operated on the CRT display of DCS. Such information includes, but is not limited to, instructional information on the equipment in question from the CAI unit; the past process information occurred in the equipment in question, operation histories in the case of disorders, trouble cases, operation guidance information, and other information from the database unit (DB); and a simulated operation training of the equipment in question from the dynamic simulator (DS) The instructional information and other information can be displayed on a display of the workstations (WSs) 4, 6 and 7 or the personal computer (PC) 5, as well as on the CRT display of DCS.

To be more specific, by taking the flowmeter or pump on which the database is constructed as an example, a database unit having data compiled according to an identifying means (e.g., a tag number, type of the device) of the flowmeter or pump, an operation monitor and control means, and instructional information of the instructional information of the CAI unit related to flowmeters or pumps having the tag number (or type) in question are connected via a mediating means. By this configuration, when an operator detects an disorder or trouble (the flow rate is higher/lower than normal; pump abnormality) of the target flowmeter or pump on the operation monitor and control means (DCS in the above embodiment) by means of an alarm, the operator can obtain, in addition to a conventional alarm guidance, i.e., information indicated as "tag number xx, the flow rate is high/low" or "tag number xx, abnormal pump conditions", the information on the past disorders (troubles) of the flowmeter or pump corresponding to the identifying means, which information is selected, unarchived and displayed by the operator as necessary or automatically. Consequently, one can immediately know a disorder (trouble) history (e.g., all the assumed causes, specifying methods or criteria, effects, measures) of the flowmeter or pump and can take more suitable measures. In addition, leaning effects on the measures against disorder (trouble) can be enhanced as information on the flowmeter or pump can be obtained according to necessity. After emergent measures against the disorder (trouble) have been taken, the operator can select, unarchive and display related instructional information in the CAI unit, which is connected by the use of a mediating means beforehand, and can further grasp knowledge and understanding, and can learn, on demand, principles, common techniques, skills and expertise on the flowmeter or pump to ensure more safety and stable operations. This procedure is effective particularly for operators who have insufficient experiences, knowledge, and skills on disorders (troubles) of the plant in question. To be more specific, they can learn, at a glance, disorder (trouble) experiences of experienced operators, assumed causes of the disorder, specifying methods, effects and measures to be taken from the database, and technical information possessed by a wide variety of technical experts and engineers from the CAI unit by means of a simple operation (e.g., with just a click on the screen or input of the tag number on the control panel) on the operation monitor and control means. Therefore, the system can ease insecurities and clear questions of operators during operation, and can support operators in large plants or during operations, which invite great stress once disorders happen.

Figure 3:
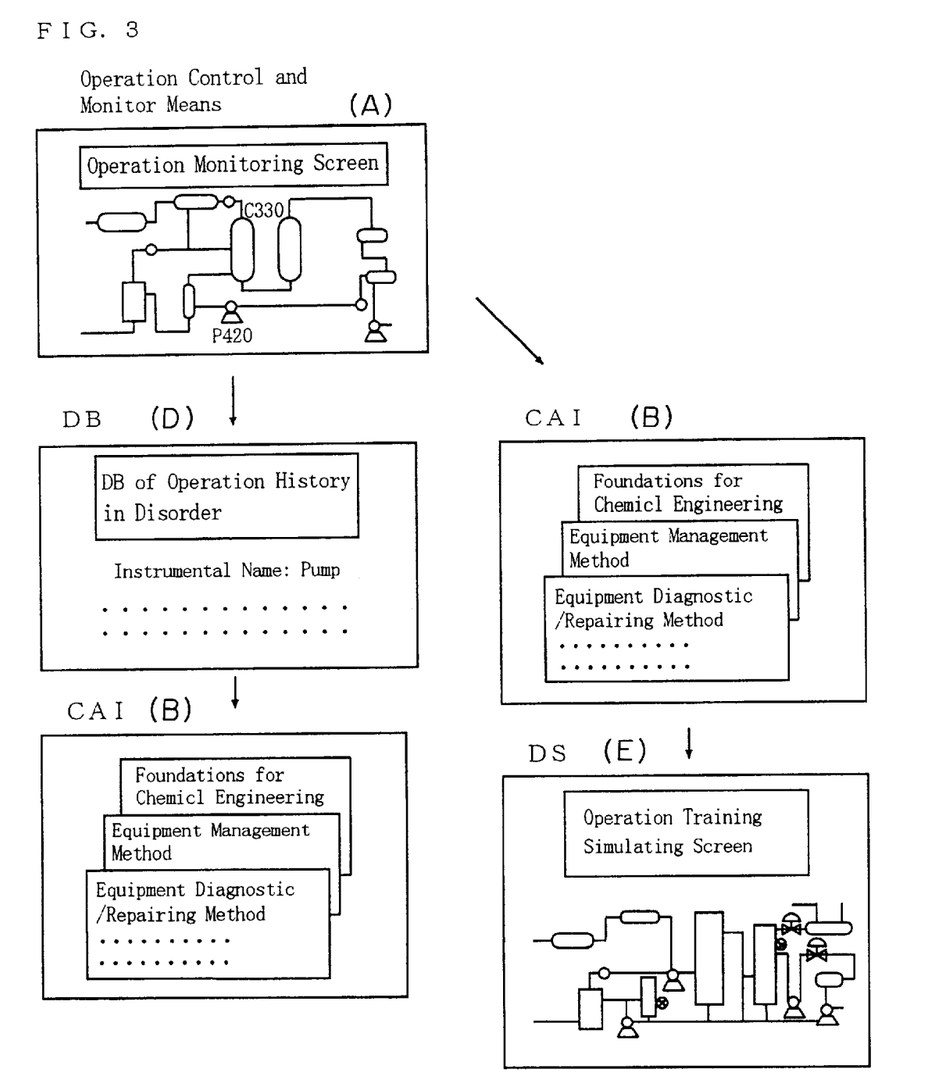
FIG. 3 is a schematic diagram illustrating an embodiment of operations which can be extended by the use of functions of individual equipment or means shown in the functional block diagram of FIG. 2.

FIG. 3 is a schematic diagram showing an example of operations which can be expanded using the functions of individual pieces of equipment or means [the operation monitor and control means, CAI unit, dynamic simulator, database unit (process database unit and/or technical database unit)] shown in the functional block diagram of FIG. 2. FIG. 3 illustrates a flow (flow shown at the left of the figure) of learning with the use of the inventive instructional system in case that a disorder, abnormality, trouble or any other failure occurs in a pumping device in the process while an operator monitors an operation monitoring screen of the operation monitor and control means and operates an operation, and the operator becomes aware of the failure by means of an alarm, guidance or another abnormality alarm, or in case that he/she has a question on the pumping device.

The learner (operator) clicks on the pump indicated on the operation monitoring screen of the operation monitor and control means or inputs an identifying means (e.g., an instrumental number) on the console panel, and inspects a DB such as a "DB of operation history in disorder" or a "DB of the past disorder and trouble cases" in the database unit (DB), which databases have the past disorder/trouble history of the pump in question. By this procedure, the learner can check what kind of history the pump has, to ensure more reliable measures against the disorder, abnormality, and trouble of the pump. In addition, he/she can learn and grasp the principle of pumps of this type by selecting and unarchiving, for example, the basic configuration, principle, features, and maintenance method of the pump from the computer-assisted instructional system unit (CAI).

FIG. 3 also illustrates a flow (flow at the right of the figure) of an example of learning and study by the use of the inventive instructional system, when an operator intends to grasp the principle of distillation on a distilling column unit in the process and to study a more efficient operation procedure while monitoring an operation monitoring screen of the operation monitor and control means and performing an operation.

The learner (operator) in this case clicks the distilling column unit indicated on the operation monitoring screen of the operation monitor and control means or input an identifying means (e.g., designation of the unit) on the console panel to select and unarchive, for instance, the basic configuration, principle, features, and maintenance method of the distilling column unit from the CAI unit and thereby learn and grasp the principle of the distilling column unit. In addition, if the operator intends to study a more efficient operation procedure, he/she can try and repeat a simulated operation of the distilling column constructed in the dynamic simulator (DS) on an operation training simulator screen a desired number of times, after the grasp of the principle and common knowledge on distilling columns through the CAI unit, and can change the operation procedure in the actual process on the basis of the study. In other words, the aforementioned study does not require an immediate operation on the distilling column unit in the actual plant.

Likewise as in the above two examples, any other instructional information can be learnt adequately in the line of duty by connecting the computer-assisted instructional system unit (CAI) with the operation monitor and control means, database unit (DB), and dynamic simulator (DS) so as to select and unarchive according to objectives on the basis of an identifying means. Such other instructional information is on, for example, pumps and other fluid transporting units, heat exchangers and compressors, reactors, blowers, dryers (desiccators), refrigerating machines, dynamo-electric generators, pulverizers, dust collectors, granulators, stirrers (agitators), mixers, filters, separators, conveyers and other powder transporting units, tanks and other fluid reservoirs, silos and other powder reservoirs, heating furnaces, absorbers, control valves, remotely operated valves, thermometers, pressure gauges, flowmeters, gravimeters, viscometers, airflow meters, hygrometers, densitometers or concentration meters, moisture meters, piping and other equipment in the process; interlock systems, sequential control, programmable control systems, and other instrumentation units.

Figure 4:
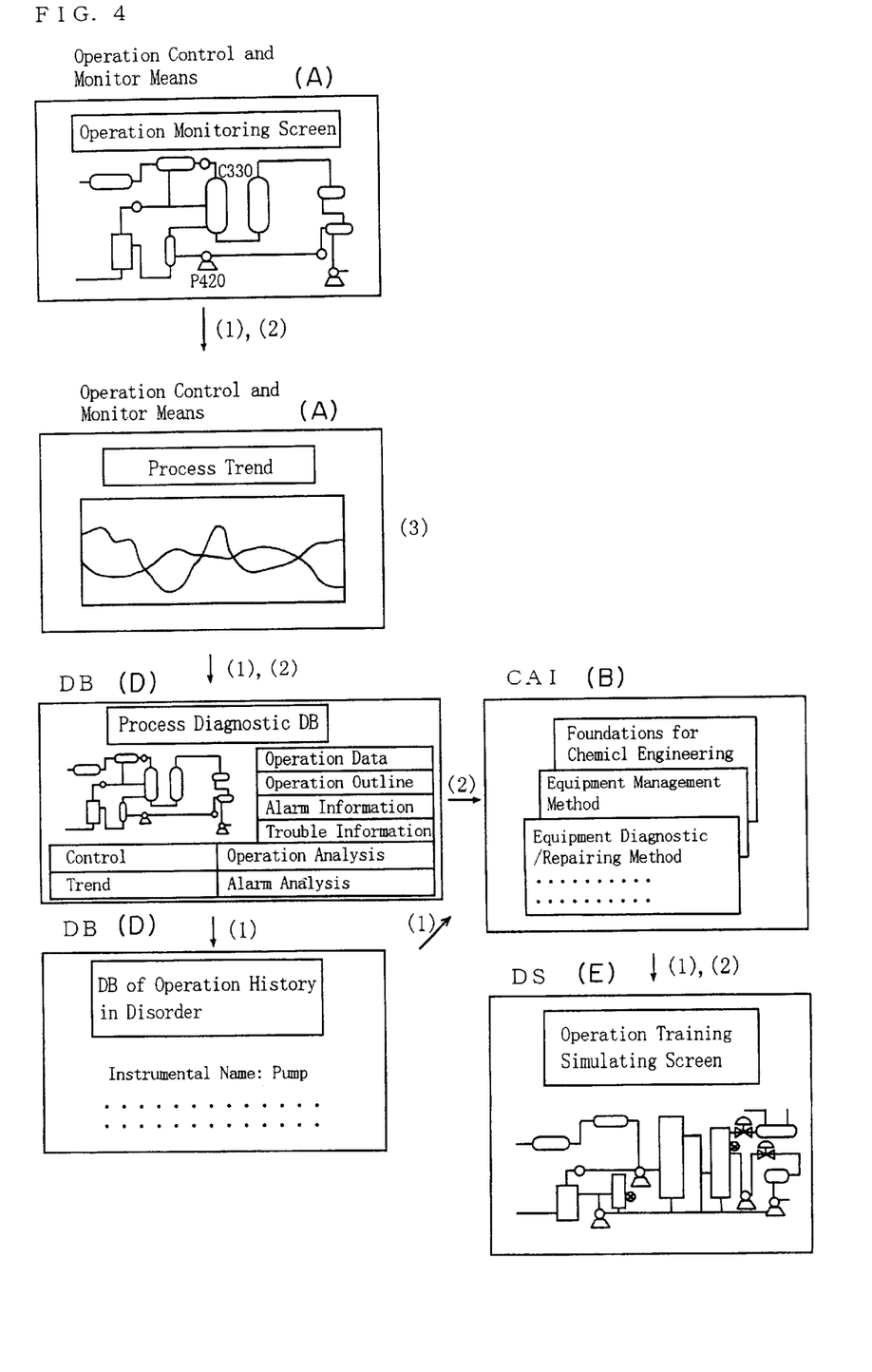
FIG. 4 is a schematic diagram illustrating another embodiment of operations which can be extended by the use of functions of individual equipment or means shown in the functional block diagram of FIG. 2.

FIG. 4 is a schematic diagram showing another example of operations which can be expanded using the functions of individual pieces of equipment or means [the operation monitor and control means, CAI unit, dynamic simulator, database unit (process database unit and/or technical database unit)] shown in the functional block diagram of FIG. 2. FIG. 4 illustrates a flow (flow (1) shown in the figure) of an operation procedure and learning with the use of the inventive instructional system, in case that a disorder, abnormality, trouble or any other failure occurs in a unit (or apiece of equipment) in the process while an operator monitors an operation monitoring screen of the operation monitor and control means and performs an operation, and the operator becomes aware of the failure by means of an alarm, guidance or another abnormality alarm.

The learner (operator) clicks on the unit indicated on the operation monitoring screen of the operation monitor and control means or input an identifying means (e.g., an instrumental number) on the console panel, and unarchives a "process diagnostic DB" from the database unit (DB) to inspect required information for operation control. By this procedure, he/she can check how the operation of the unit of the process in question should be controlled to ensure more reliable, safety, and stable operation procedures. The above process diagnostic DB holds the past operation information, operation outline, control means, trend under normal conditions and other technical information required for operation control of the unit, which information and data have been input beforehand.

Once the learner clicks on the unit indicated on the operation monitoring screen of the operation control and monitor means or inputs the identifying means (e.g., an instrumental number) and inspect the pat disorder and trouble history of the unit in question from the database unit (DB), he/she can verify what history the unit has to ensure more reliable means against disorders, abnormalities, troubles and other failures of the verified unit on the process.

After taking emergent measures against a disorder, abnormality, or trouble of the unit on the process, the learner can select and unarchive, for example, the basic configuration, principle, features, and maintenance method of the unit from the computer-assisted instructional system (CAI). By this procedure, he/she can further learn and grasp common principles of the unit and verify the adequacy of the measures in comparison with the common techniques, skills and maintenance methods, to ensure more reliable measures to be taken and to learn a wide variety of techniques, skills and maintenance methods.

In addition, if the learner (operator) intends to study a more efficient operation procedure, he/she can try and repeat a simulated operation of the unit constructed in the dynamic simulator (DS) on an operation training simulating screen a desired number of times, after the grasp of the principle and common knowledge on the unit through the CAI unit, and can change the operation procedure in the actual process on the basis of the study. In other words, the aforementioned study does not require an immediate operation on the unit in the actual plant.

FIG. 4 also illustrates a flow (flow (2) in the figure) of an example of selecting and unarchiving information of the unit in question from the CAI unit to learn, for instance, the general configuration, principle, features and maintenance method of the unit and to learn and grasp the principle of the unit, after unarchiving and checking the "process diagnostic DB".

In addition, if the operator intends to study a more efficient operation procedure, he/she can try and repeat a simulated operation of, for example, a distilling column constructed in the dynamic simulator (DS) on an operation training simulator screen a desired number of times, after the grasp of the principle and common knowledge on the unit through the CAI unit, and can change the operation procedure in the actual process on the basis of the study. In other words, the aforementioned study does not require an immediate operation on the distilling column unit in the actual plant.

Likewise as in the above two examples, any other instructional information can be learnt in an adequate manner, by connecting the computer-assisted instructional system unit (CAI) with the operation monitor and control means, database unit (DB), and dynamic simulator (DS) so as to select and unarchive according to objectives on the basis of an identifying means. Such other instructional information is on, for example, pumps and other fluid transporting units, heat exchangers and compressors, reactors, and other equipment and units of the process described in the explanation of FIG. 3.

The embodiment illustrated in FIG. 4 can further be expanded in a similar manner as in the above two examples, when an operator checks process trends of, for example, temperatures, flow rates and pressures to monitor the operation conditions of the process during a normal operation procedure, and finds an abnormal trend different from normal trends ((3) in the figure).

By taking a click on the screen or input on the console panel as an example, the input technique of the identifying means (a method of allowing the system to identify the identifying means) is described in the above embodiments. The input technique is not limited to the above examples and can be any technique that can specify and identify each identifying means. The technique includes, for instance, (i) a technique of preparing button icons corresponding to the individual identifying means on a screen (e.g., by preparing a button icon of the tag number, or preparing a button ion of individual pieces of equipment in a picture screen such as a process flow chart), and performing a procedure such as a clicking of the button icon, touch or point on the button icon to make the system identify the identifying means, and (ii) a technique of preparing buttons corresponding to the individual identifying means on a console panel or a keyboard and pushing a target button, or input, for instance, a character, numeral or symbol corresponding to each identifying means on a console panel or keyboard.

All pieces of equipment or means [the operation monitor and control means, CAI, DS and DB] shown in the functional block diagram of FIG. 2 must not necessarily be connected with one another via communication cables (LAN), and only required pieces of equipment can be connected with one another via communication cables. By selecting an adequate combination of individual pieces of the equipment to be connected on the LAN, each of the inventive instructional systems 1 to 8 can be constructed.

The inventive instructional system 2 has only to comprise at least the mediating means (C1) or (C3) as an mediating means, but preferably comprises the mediating means (C1), (C2) and (C3). The inventive instructional system 3 has only to comprise at least the mediating means (C1) or (C4) as an mediating means, but preferably comprises the mediating means (C1), (C4) and (C6). Likewise, in preferred embodiments, the instructional system 4 has all the mediating means (C1) through (C6) as mediating means, and the instructional system 5 has the mediating means (C2), (C4) and (C6) as mediating means. The instructional system 7 should preferably comprise the mediating means (C3), (C5), and (C6) as mediating means.

Regarding the mediating means (C2), (C3) and (C6), in which the database unit (D) is involved, an mediating means in which the process database unit (D1) is involved, and an mediating means in which the technical database unit (D2) is involved can be provided separately.

According to the invention, if the necessity arises for an operator to check technical questions, insecurities, and/or to verify basic principles on equipment during operation or during excursion of work, he/she can immediately select and learn the information or data stored in the CAI unit upon the use of the operation monitor and control means. As one can link equipment or operation information of the plant which one actually operates with the instructional information in the CAI unit, and one can link inherent techniques, skills, expertise, experiences on problems and troubles, operation histories in case of disorder and operation guidance information obtained in the past operation control and equipment management of the plant with the instructional information in the CAI unit. The learning effect does not vary with levels of the skills or knowledge of learners, and can satisfactorily be exhibited, in particular, in operators having insufficient skills and experiences and thus requiring instructions. In addition, experienced operators can corroborate the past findings, techniques, skills, expertise, and experiences not only by operational viewpoints but also by the principles to ensure more sophisticated and safety operation control.

As learners can link the equipment and operation information of the plant, which they actually operate, with the information stored in the CAI unit, some of them feel familiar with the instructional information in the CAI unit, and have increased motivation for learning. Station of instructors having sufficient techniques, skills, and experiences is therefore not necessarily required, which is indispensable to gain sufficient learning effects according to conventional technologies.

The learners can receive sufficient sense of unity (approach) between the task and instruction, and can gain necessary instructional information at anytime when necessary, without providing an extra time for learning. They can repeat learning a curriculum until they can sufficiently understand, or they can skip over a curriculum according to their levels if they grasp the details completely by utilizing the features (advantages) of the CAI unit.

When a combination of the CAI unit and the dynamic simulator is used, the learners can try a simulated operation on a simulated plant to verify the learning obtained through the CAI unit. In a combination use of the dynamic simulator and the database unit, the learners (operators) can perform a simulated operation with reference to the past findings, operation histories, and other information on individual pieces of equipment to enable a more satisfactory training.

In summary, according to the inventive activity-support instructional system, operators can immediately gain and learn necessary information in the line of duty during operation or when required. They can immediately obtain required general instructional information and the past process information on equipment constituting the plant to learn necessary information and data and perform training with efficiency. The distance between the instructions and actual tasks can therefore be reduced to make the both indistinguishable. In addition, the levels of operators can be boosted to enable more reliable operation control and equipment management.

Other embodiments and variations will be obvious to those skilled in this art; this invention is not to be limited except as set forth in the following claims.

What is claimed is:

1. An activity-support instructional system comprising:
   (1) operation monitor and control means (A) for entering process condition signals from plural pieces of equipment constituting a plant on an identifying means basis to monitor and control each piece of said equipment, said identifying means being uniquely provided on each piece of said equipment;
   (2) a computer-assisted instructional system unit (B) having instructional information entered and configured therein, said instructional information being to learn general techniques, skills, know-how on equipment to be used in general plants including said equipment, and principles related to these matters; and
   (3) mediating means (C1) which links an individual piece of equipment monitored and controlled by said operation monitor and control means (A) with instructional information of said computer-assisted instructional system unit (B) related to said individual piece of equipment on the basis of said identifying means, and which is capable of selecting, unarchiving and displaying necessary instructional information on said individual piece of equipment on the basis of said identifying means.

2. An activity-support instructional system comprising:
   (1) operation monitor and control means (A) for entering process condition signals from plural pieces of equipment constituting a plant on an identifying means basis to monitor and control each piece of said equipment, said identifying means being uniquely provided on each piece of said equipment;
   (2) a computer-assisted instructional system unit (B) having instructional information entered and configured therein, said instructional information being to learn general techniques, skills, know-how on equipment to be used in general plants including said equipment, and principles related to these matters;
   (3) at least one database unit (D) selected from a process database unit (D1) and a technical database unit (D2), said process database unit (D1) having operation data composed of process condition signals stored in time sequence on each of said identifying means basis, said process condition signals being from each piece of equipment constituting said plant, and said technical database unit (D2) having technical data composed of information or capability/performance of the equipment or both, said information or capability/performance or both being collected, processed and reduced on each said identifying means basis, and said information being process information related to process conditions in disorder, in fluctuations or in troubles of the past of said each piece of the equipment; and
   (4) at least one mediating means selected from a mediating means (C1) and a mediating means (C3), said mediating means (C1) linking an individual piece of equipment monitored and controlled by said operation monitor and control means (A) with instructional information of said computer-assisted instructional system unit (B) related to said individual piece of equipment on the basis of said identifying means, and being capable of selecting, unarchiving and displaying necessary instructional information on said individual piece of equipment on the basis of said identifying means, and said mediating means (C3) linking data of said database unit (D) related to each piece of equipment with the instructional information of said computer-assisted instructional system unit (B) on the basis of said identifying means, and being capable of selecting, unarchiving and displaying necessary instructional information on said each piece of equipment on the basis of said identifying means.

3. An activity-support instructional system comprising:
(1) operation monitor and control means (A) for entering process condition signals from plural pieces of equipment constituting a plant on an identifying means basis to monitor and control each piece of said equipment, said identifying means being uniquely provided on each piece of said equipment;
(2) a computer-assisted instructional system unit (B) having instructional information entered and configured therein, said instructional information being to learn general techniques, skills, know-how on equipment to be used in general plants including said equipment, and principles related to these matters;
(3) a dynamic simulator (E) for enabling a simulated operation training on equipment constituting said plant; and
(4) at least one mediating means selected from a mediating means (C1) and a mediating means (C4), said mediating means (C1) linking an individual piece of equipment monitored and controlled by said operation monitor and control means (A) with instructional information of said computer-assisted instructional system unit (B) related to said individual piece of equipment on the basis of said identifying means, and being capable of selecting, unarchiving and displaying necessary instructional information on said individual piece of equipment on the basis of said identifying means, said mediating means (C4) linking an individual piece of equipment monitored and controlled by said operation monitor and control means (A) with each piece of equipment to be a target of a simulated operation in said dynamic simulator (E) on the basis of said identifying means, and being capable of selecting, unarchiving and displaying a simulated operation on said each piece of equipment on the basis of said identifying means.

4. An activity-support instructional system comprising:
(1) operation monitor and control means (A) for entering process condition signals from plural pieces of equipment constituting a plant on an identifying means basis to monitor and control each piece of said equipment, said identifying means being uniquely provided on each piece of said equipment;
(2) a computer-assisted instructional system unit (B) having instructional information entered and configured therein, said instructional information being to learn general techniques, skills know-how on equipment to be used in general plants includes said equipment, and principles related to these matters;
(3) at least one database unit (D) selected from a process database unit (D1) and a technical database unit (D2), said process database unit (D1) having operation data composed of process condition signals stored in time sequence on each of said identifying means basis, said process condition signals being from each piece of equipment constituting said plant, and said technical database unit (D2) having technical data composed of information or capability/performance of the equipment or both, said information or capability/performance or both being collected, processed and reduced on each said identifying means basis, and said information being process information related to process conditions in disorder, in fluctuations or in troubles of the past of said each piece of the equipment;
(4) a dynamic simulator (E) for enabling a simulated operation training on equipment constituting said plant; and
(5) at least one mediating means selected from a mediating means (C1), a mediating means (C3) and a mediating means (C6), said mediating means (C1) linking an individual piece of equipment monitored and controlled by said operation monitor and control means (A) with instructional information of said computer-assisted instructional system unit (B) related to said individual piece of equipment on the basis of said identifying means, and being capable of selecting, unarchiving and displaying necessary instructional information on said individual piece of equipment on the basis of said identifying means, said mediating means (C3) linking data of said database unit (D) related to each piece of equipment with the instructional information of said computer-assisted instructional system unit (B) on the basis of said identifying means, and being capable of selecting, unarchiving and displaying necessary instructional information on said each piece of equipment on the basis of said identifying means, and said mediating means (C6) linking each piece of equipment to be a target of a simulated operation in said dynamic simulator (E) with data of said database unit (D) related to said each piece of equipment on the basis of said identifying means, and being capable of selecting, unarchiving and displaying said operation data or technical data necessary on said each piece of equipment on the basis of said identifying means.

5. An activity-support instructional system comprising:
(1) operation monitor and control means (A) for entering process condition signals from plural pieces of equipment constituting a plant on an identifying means basis to monitor and control each piece of said equipment, said identifying means being uniquely provided on each piece of said equipment;
(2) at least one database unit (D) selected from a process database unit (D1) and a technical database unit (D2), said process database unit (D1) having operation data composed of process condition signals stored in time sequence on each of said identifying means basis, said process condition signals being from each piece of equipment constituting said plant, and said technical database unit (D2) having technical data composed of information or capability/performance of the equipment or both, said information or capability/performance or both being collected, processed and reduced on each said identifying means basis, and said information being process information related to process conditions in disorder, in fluctuations or in troubles of the past of said each piece of the equipment;
(3) a dynamic simulator (E) for enabling a simulated operation training on equipment constituting said plant; and (4) a mediating means (C6) which links each piece of equipment to be a target of a simulated operation in said dynamic simulator (E) with data of said database unit (D) related to said each piece of equipment on the basis of said identifying means, and which is capable of selecting, unarchiving and displaying said operation data or technical data necessary on said each piece of equipment on the basis of said identifying means.

6. An activity-support instructional system comprising:

(1) at least one database unit (D) selected from a process database unit (D1) and a technical database unit (D2), said process database unit (D1) having operation data composed of process condition signals stored in time sequence on each of said identifying means basis, said process condition signals being from each piece of equipment constituting said plant, and said technical database unit (D2) having technical data composed of information or capability/performance of the equipment or both, said information or capability/performance or bath being collected, processed and reduced on each said identifying means basis, and said information being process information related to process conditions in disorder, in fluctuations or in troubles of the past of said each piece of the equipment;

(2) a computer-assisted instructional system unit (B) having instructional information entered and configured therein, said instructional information being to learn general techniques, skills, know-how on equipment to be used in general plants including said equipment, and principles related to these matters; and (3) mediating means (C3) which links data of said database unit (D) related to each piece of equipment with the instructional information of said computer-assisted instructional system unit (B) on the basis of said identifying means, and which is capable of selecting, unarchiving and displaying necessary instructional information on said each piece of equipment on the basis of said identifying means.

7. An activity-support instructional system comprising:

(1) at least one database unit (D) selected from a process database unit (D1) and a technical database unit (D2), said process database unit (D1) having operation data composed of process condition signals stored in time sequence on each of said identifying means basis, said process condition signals being from each piece of equipment constituting said plant, and said technical database unit (D2) having technical data composed of information or capability/performance of the equipment or both, said information or capability/performance or both being collected, processed and reduced on each said identifying means basis, and said information being process information related to process conditions in disorder, in fluctuations or in troubles of the past of said each piece of the equipment;

(2) a computer-assisted instructional system unit (B) having instructional information entered and configured therein, said instructional information being to learn general techniques, skills, know-how on equipment to be used in general plants including said equipment, and principles related to these matters;

(3) a dynamic simulator (E) for enabling a simulated operation training on equipment constituting said plant; and (4) at least one mediating means selected from a mediating means (C3) and a mediating means (C6), said mediating means (C3) linking data of said database unit (D) related to each piece of equipment with the instructional information of said computer-assisted instructional system unit (B) on the basis of said identifying means, and being capable of selecting, unarchiving and displaying necessary instructional information on said each piece of equipment on the basis of said identifying means, and said mediating means (C6) linking each piece of equipment to be a target of a simulated operation in said dynamic simulator (E) with data of said database unit (D) related to said each piece of equipment on the basis of said identifying means, and being capable of selecting, unarchiving and displaying said operation data or technical data necessary on said each piece of equipment on the basis of said identifying means.

* * * * *